United States Patent [19]

Howell

[11] Patent Number: 5,224,745
[45] Date of Patent: Jul. 6, 1993

[54] DEVICE FOR ATTACHING MATERIALS TO TREE LIMBS

[76] Inventor: J. Franklin Howell, 615 S. 35th Ave., Yakima, Wash. 98902

[21] Appl. No.: 851,891

[22] Filed: Mar. 16, 1992

[51] Int. Cl.⁵ .............................................. B25J 1/04
[52] U.S. Cl. .................................................. 294/19.1
[58] Field of Search ............... 294/19.1, 22, 23, 99.1; 29/225; 40/316, 586, 617, 618, 662, 666; 81/177.6, 487, 488; 248/343, 544; 43/124, 132.1

[56] References Cited

U.S. PATENT DOCUMENTS

| | | | |
|---|---|---|---|
| 1,197,139 | 9/1916 | Mastin | 294/19.1 |
| 1,702,319 | 2/1929 | Sargent et al. | 294/19.1 X |
| 2,372,930 | 4/1945 | Bovee | 294/19.1 X |
| 3,327,376 | 6/1967 | Freeman et al. | 294/19.1 X |
| 3,346,293 | 10/1967 | Wilcox | 294/19.1 |
| 3,469,878 | 9/1969 | De Haan | 294/19.1 |
| 4,163,576 | 8/1979 | Hoop | 294/19.1 |
| 4,225,108 | 9/1980 | Jaroche | 294/19.1 X |
| 4,953,905 | 9/1990 | Cohen | 294/19.1 |
| 5,052,733 | 10/1991 | Cheung et al. | 294/19.1 |

Primary Examiner—Johnny D. Cherry
Attorney, Agent, or Firm—Stratton Ballew Richardson

[57] ABSTRACT

A device for attaching materials to remote bodies, such as tree limbs or overhead wires is disclosed. The device has an elongated body with a first and second end. A clamping system capable of slidably affixing a fastener and attached material is attached to the elongated body first end. A method for attaching materials to remote bodies also is disclosed.

7 Claims, 3 Drawing Sheets

DEVICE FOR ATTACHING MATERIALS TO TREE LIMBS

TECHNICAL FIELD

This invention relates to a device and method for attaching materials to remote bodies, such as plants. More particularly, both the device and method of this invention relate to an elongated body with a clamping system to place a fastening device about a remote body, such as a tree limb, where the material to be attached to the remote body is affixed to the fastener.

BACKGROUND OF THE INVENTION

The problem of attaching or removing materials from physically remote bodies, such as tree limbs or overhead wires is well known. There are a number of ways to approach this problem, especially when the tree limb or overhead wire is outside of hand's reach. One approach to the problem is to use a ladder or some mechanism which actually raises the person doing the work to the level necessary to allow them to attach the material to the desired body.

In general, a more satisfactory approach for simpler attachments has been to use a mechanism that effectively extends the reach of an individual by using a device which allows the individual to stand at ground level and reach out to the remote body. These devices have been used, and while an improvement over physically moving individual workers, frequently these devices have a number of moving parts which can make them expensive to manufacture, and cause some difficulties in maintenance. Also, a number of these devices which involve remotely operatable fingers, etc. can be difficult for an operator to master and use efficiently.

Additional problems are encountered when the remote body which is to have the material attached to it is sensitive to damage, such as a plant. Plant limbs, and some nonorganic bodies, can be very sensitive and susceptible to damage, especially if the manner in which the materials are attached to them damages an outer covering or bark. A number of methods using spring clamps to attach materials around electrical wiring or hooks to remove materials clamped to wires or ropes, etc. are unworkable for the use of attaching or removing materials from more fragile bodies, such as young fruit trees.

As illustrated by the above discussion, there are a number of desireable features for a device or apparatus for attaching materials to remote bodies, such as overhead wires or tree limbs. It would be desireable to have a device which allowed one to attach the material to a remote body such as a tree limb without requiring that the operator be removed from the ground. It would be desireable to have a device to attach materials to a remote body that is mechanically simple, to minimize or eliminate moving parts to reduce the cost of production. Further, it would be desireable to have a device to attach materials to a remote body such as a tree limb which is straight-forward to operate. In addition, it would be desireable to have a device to attach materials to a remote body such as a tree limb which would not damage the body to which the materials were attached. It also would be desireable to have a device for attaching materials to a remote body, such as a tree limb, which could be stored compactly when not in use.

While the discussion herein relates to devices and methods for attaching materials to remote bodies such as tree limbs, it is not intended that the invention be limited to this situation. It will be obvious from the description that follows that the present invention will be useful in other applications with problems common to those described herein.

DISCLOSURE OF THE INVENTION

It is the object of the present invention to provide a device to allow the attachment of materials to remote bodies such as tree limbs.

It also is the object of the present invention to provide a device to attach materials to remote bodies such as tree limbs that is inexpensive to manufacture.

It is a further object of the present invention to provide a device to attach materials to a remote body that is simple to operate.

It is yet another object of the present invention to provide a device to attach materials to a remote body such as a tree limb that will not damage the body to which the materials are attached.

It is yet a further object of the present invention to provide a method by which materials may be attached to a remote body, such as a tree limb.

The present invention achieves these and other objectives, which will become apparent in the description that follows, by providing a device which enables material to be attached to the remote body to be affixed to a fastener, that in turn is attached to the tree limb or other remote body without requiring that an operater leave the ground.

In a preferred embodiment of the present invention, an attachment device which includes an elongated body with a clamping system at one end. The clamping system is constructed to accept a fastener. The opposite end of the elongated body may or may not have a handle attached, depending on the size of the elongated body and the requirements of the operator.

In an alternative preferred embodiment of the present invention, the elongated body telescopes in and out so that the length of the elongated body can be adjusted for the appropriate application. Also, by telescoping, the device is much easier to handle and store when not in use if the elongated body can be telescoped in.

In a further preferred alternative embodiment of the present invention, the elongated body of the device is made of a flexible material such as fiberglass or graphite.

An additional alternative preferred embodiment of the present invention provides a method for attaching materials to remote bodies such as tree limbs. The method for this alternative preferred embodiment involves the steps of attaching a piece of material to a fastener, placing the fastener in a clamping system, using an elongated rod to lift the clamping system and the clamped fastener to the remote body, fitting the fastener around the remote body, then removing the clamping system from the fastener, leaving the fastener and attached material in place.

DETAILED DESCRIPTION OF PREFERRED EMBODIMENTS

Figure 1:
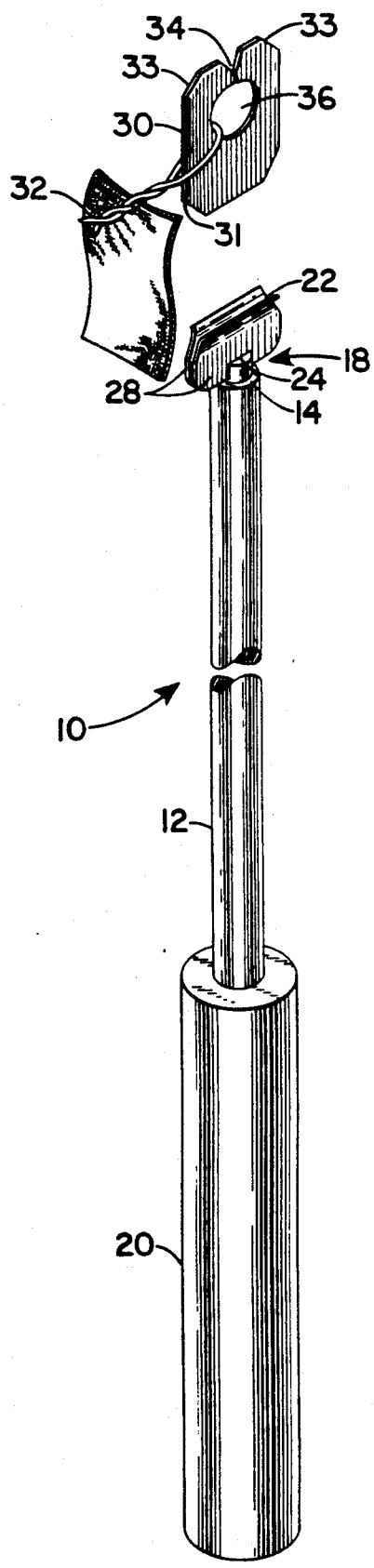
FIG. 1 is a perspective view of a preferred embodiment constructed in accordance with the present invention.
Figure 2:
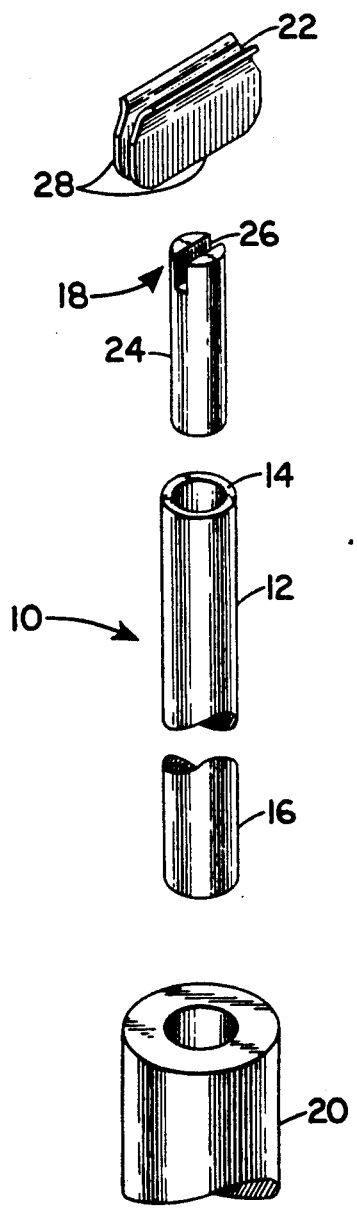
FIG. 2 is a partial exploded, perspective view of a preferred embodiment constructed in accordance with the present invention.

An attachment device 10 is illustrated in FIGS. 1 and 2. The attachment device has an elongated body 12 with a first end 14 and second end 16. Affixed to the first end is a clamping system 18. Affixed to the second end is a handle 20.

In this preferred embodiment the clamping system is comprised of a U-shaped clamping bracket 22 and a mounting stud 24. The mounting stud is inserted into one end of the elongated body and is affixed there by adhesive, welding, or other affixing means. The mounting slot 26 and the mounting stud extend above the elongated body. The bracket is placed in and affixed to the mounting stud. The bracket walls 28 are relatively close together, and slightly curved at the bracket top. The distance between the bracket walls is sufficiently close to firmly hold a fastener 30 in place once it has been inserted between the bracket walls. At the same time, the fit of the fastener in the bracket is slidable, so that once the fastener has been attached to something, the attachment device 10 can be pulled away from the fastener.

Figure 6:
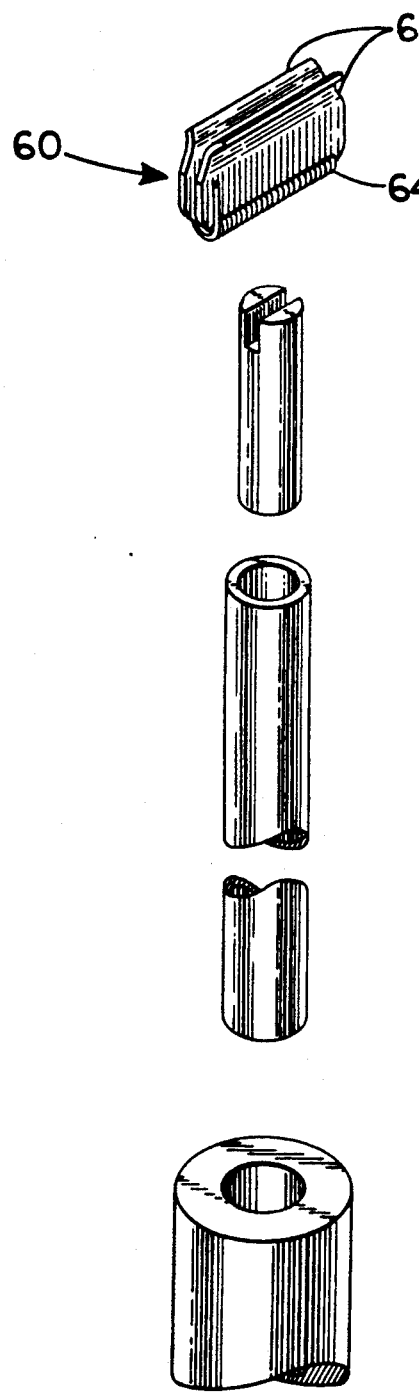
FIG. 6 is a partial exploded, perspective view of an alternative embodiment constructed in accordance with the present invention.

While the U-shaped clamping bracket used with the clamping system described in the above preferred embodiment has been used with success, it is by no means the only configuration available for the clamping system. For example, a spring loaded clamp could be used in place of the U-shaped clamping bracket if the spring holding the clamp together were not so strong as to make it difficult to remove the fastener. This alternative preferred embodiment is shown in FIG. 6, where a clamp 60 has walls 62 that are joined by coil spring 64 which also serves to tension the clamp. The primary requirement for the clamping system is that it hold the fastener in a stationary position once the fastener has been placed around the remote body. At the same time the clamping system must not be so tightly attached to the fastener that it cannot be removed smoothly and without damage to the remote body to which the fastener has been attached.

Any number of materials can be used for construction of the attachment device. The primary factors to be considered are the weight, cost, and strength of the material. Success has been achieved using substantially hollow rods made of light weight aluminum alloys such as 6061 T6 anodized aluminum tubing. Other materials that could be used depending upon their price and availability are plastic compounds such as polyvinylchloride (PVC), fiberglass, or other metals. The only limitations on the length of the elongated body are the desired application and realities of using the attachment device. In other words, the elongated body cannot be so long that it loses its structural integrity, or that the device is so unwieldy that it is difficult to use. Success has been achieved with lengths up to eight feet long, although longer lengths are envisioned.

The mounting stud 24 and clamping bracket 22 are made of steel, which is durable and suffiently light for this application, and also is inexpensive. The handle 20, if used, can be produced from any number of materials to improve the operator's grip on the attachment device. The second end 16 of the attachment device can be wrapped with tape, covered with a neoprene cylinder similar to neoprene cylinders used for bicycle and motorcycle hand grips, or the outside surface of the elongated body 12 can be knurled to give better grip.

Figure 3:
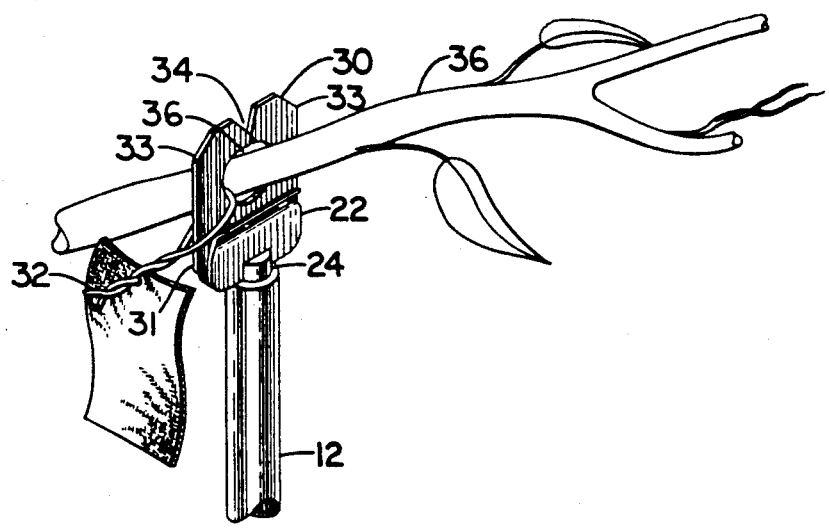
FIG. 3 is a partial environmental view illustrating the operation of a preferred embodiment constructed in accordance with the present invention.

To use the attachment device to attach the desired material to a physically remote body, first a strip of the material 32 is attached to a fastener. While the material shown in FIGS. 1 and 3 is twisted around part of the fastener, it could also be attached using tape or other adhesive, or even be made as part of the fastener. Once the material has been attached to the fastener, the fastener is inserted into the clamping bracket 22 of the clamping system 18. The operator then places the open end 34 of the fastener 30 against the remote body, in this case a tree limb 36. The open end of the fastener is then pushed against the tree limb with a slight twisting motion, which allows the tree limb to pass through the fastener open end. The attachment device is then pulled away from the fastener. As discussed above, the clamping bracket, while holding the fastener secure, has a slidable fit on the fastener and pulls away smoothly, leaving the fastener and affixed material attached to the tree limb, without damaging the tree limb.

Any number of fastener configurations can be used for the present invention. The only requirements are that the fastener be relatively light weight, be able to be pushed on to a remote body with a circular cross section, like a tree limb or electrical wire, be economical to use, and not damage the body that it is attached to. Experimentation has been conducted with a number of different factors, and success has been achieved using the KWIKLOK ® plastic fasteners used for closing plastic bread wrappers and the like. The materials that may be attached to the tree limb are limited literally only by the desired application, and include insect repellents, insect attractants, and plant identification tags.

Figure 4:
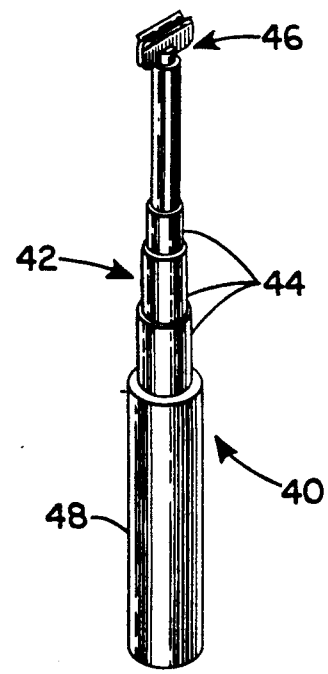
FIG. 4 is a perspective view of an alternative preferred embodiment constructed in accordance with the present invention.

In an alternative preferred embodiment illustrated in FIG. 4, the attachment device 40 uses a telescoping elongated body 42 constructed from a plurality of nested elements 44. In other aspects, the clamp system 46 and handle 48 are virtually identical to the similar elements described in the above embodiments. Similarly, the options available to the above preferred embodiment are available to this alternative preferred embodiment. The telescoping body allows greater ease in transportation and storage of the attachment device. It also allows the device to be extended only as far as is necessary. Thus, the same attachment device can be used comfortably and easily both for items that need to be tagged five feet above hand level and eight feet above hand level by partially extending the elongated body.

Figure 5:
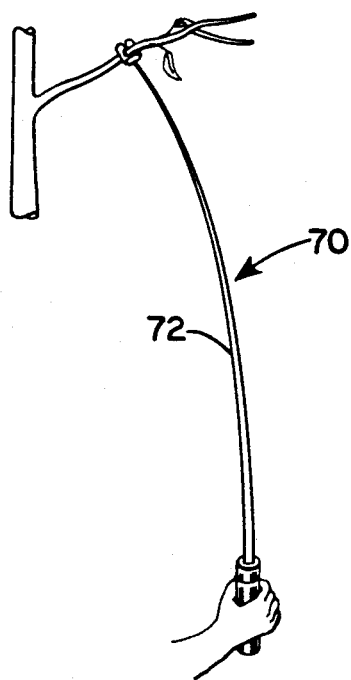
FIG. 5 is a perspective view of an alternative preferred embodiment constructed in accordance with the present invention.

Another alternative preferred embodiment is shown in FIG. 5. In this alternative preferred embodiment, the attachment device 70 has an elongated body 72 which is made up of a flexible but strong material such as fiberglass or graphite. This preferred embodiment can be used in applications where some flexibility in the elongated body may aid in the attachment process. That flexibility would not be available with a metal tube as the elongated body.

Regardless of the preferred embodiments used, or the combination of preferred embodiments used, the resulting device is one which allows the attachment or tagging of remote bodies such as tree limbs or electric wires with materials without requiring that an operator leave the ground. At the same time, this is achieved with a device that has virtually no moving parts, which translates to a device which is relatively inexpensive to manufacture, and simple and straight forward to operate. Also, the use of plastic fasteners enables easily damaged bodies, such as tree limbs, to have materials attached to them without being damaged.

INDUSTRIAL APPLICABILITY

This invention can be used for any situation where it is desirable to be able to attach materials to a remote body, such as a tree limb or overhead wire, without requiring that an operator be lifted from the ground. It is especially true in situations where the remote body to which the materials are to be attached is fragile in any way, such as a tree limb, and where the cost of manufacture and ease of operation are of concern.

In compliance with the statute, the invention has been described in a language more or less specific as to the structural features. It is understood, however, that the invention is not limited to specific features shown, since modifications are within the legitimate and valid scope of the appended claims.

I claim:

1. A device for fastening pest control material to tree limbs comprising:
   a pole having a first end and a second end;
   said second end of the pole being a handle;
   a clip receiver attached to said first end of the pole;
   a flat plastic clip having a notched entrance leading to a substantially round closable recess, said clip being removably insertable into said clip receiver;
   an element attached to said clip; and
   said element attached to said clip being impregnated with pest control material.

2. The device of claim 1 wherein the pole is constructed of telescoping segments so as to enable its operative length to be altered in a selective manner.

3. The device of claim 1 wherein the pest control material is pheromone.

4. The device of claim 1 wherein the pest control material is an insect repellent.

5. The device of claim 1 wherein the flat plastic clip is a KWIKLOK fastener.

6. The device of claim 1 wherein the pest control material is an insect attractant.

7. The device of claim 1 wherein said element attached to said clip is a plant identification tag.

* * * * *